(12) United States Patent
Hochwarth et al.

(10) Patent No.: US 11,302,204 B2
(45) Date of Patent: Apr. 12, 2022

(54) FLIGHT MANAGEMENT SYSTEM AND METHOD OF UPDATING

(71) Applicant: GE AVIATION SYSTEMS LLC, Grand Rapids, MI (US)

(72) Inventors: Joachim Karl Ulf Hochwarth, Caledonia, MI (US); Christian Reynolds Decker, Ada, MI (US); David Michael Lax, Cascade Township, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 548 days.

(21) Appl. No.: 15/943,258

(22) Filed: Apr. 2, 2018

(65) Prior Publication Data
US 2019/0304314 A1 Oct. 3, 2019

(51) Int. Cl.
*G08G 5/00* (2006.01)
*G01C 23/00* (2006.01)

(52) U.S. Cl.
CPC ......... *G08G 5/0091* (2013.01); *G01C 23/005* (2013.01); *G08G 5/0008* (2013.01); *G08G 5/0013* (2013.01); *G08G 5/0021* (2013.01); *G08G 5/0039* (2013.01)

(58) Field of Classification Search
None
See application file for complete search history.

(56) References Cited

U.S. PATENT DOCUMENTS

| | | | |
|---|---|---|---|
| 7,612,688 B1 | 11/2009 | Flynn | |
| 8,135,500 B1 | 3/2012 | Robinson | |
| 8,868,345 B2 | 10/2014 | Lax | |
| 9,171,473 B1 | 10/2015 | Sheth | |
| 9,535,158 B1 | 1/2017 | Breiholz et al. | |
| 9,745,052 B2 | 8/2017 | Lax | |
| 9,824,593 B1 | 11/2017 | Delaney | |
| 9,847,031 B2 | 12/2017 | Brabham | |
| 9,870,712 B1 | 1/2018 | Weichbrod | |
| 10,043,402 B1 * | 8/2018 | Alvarez | G01C 23/005 |
| 2004/0078136 A1 | 4/2004 | Massy | |
| 2009/0134981 A1 * | 5/2009 | Shafaat | G08G 5/0008 340/313 |
| 2011/0208374 A1 | 8/2011 | Jayathirtha et al. | |
| 2013/0006533 A1 | 1/2013 | Lax | |
| 2013/0226373 A1 | 8/2013 | Klooster | |
| 2014/0058591 A1 | 2/2014 | Petter | |

(Continued)

FOREIGN PATENT DOCUMENTS

| | | | | |
|---|---|---|---|---|
| EP | 1717553 A2 | 11/2006 | | |
| EP | 2575121 A2 | 4/2013 | | |
| WO | WO-2019077694 A1 * | 4/2019 | | G05D 1/0858 |

OTHER PUBLICATIONS

European Patent Office, European Search Report re Application No. 19166414.3-1203, dated Sep. 9, 2019, 8 Pages, Munich, Germany.

*Primary Examiner* — Kelly D Williams
(74) *Attorney, Agent, or Firm* — McGarry Bair PC (57) ABSTRACT

A flight management system and method of updating flight calculations includes flying an aircraft along a current flight path, collecting real-time weather data from a network of aircraft operating in a nearby region, and predicting a trajectory for completion of the flight. The prediction can be based on the collected real-time weather data.

20 Claims, 5 Drawing Sheets

(56) References Cited

U.S. PATENT DOCUMENTS

| | | |
|---|---|---|
| 2014/0331161 A1 | 11/2014 | Venkataswamy et al. |
| 2015/0348421 A1 | 12/2015 | Kashi et al. |
| 2016/0041305 A1 | 2/2016 | Stulken et al. |
| 2017/0092139 A1* | 3/2017 | Wang .................. G01S 13/87 |
| 2017/0121011 A1 | 5/2017 | Lax |
| 2017/0121027 A1 | 5/2017 | Lax |
| 2017/0121028 A1 | 5/2017 | Lax |
| 2017/0132938 A1 | 5/2017 | Borgyos |
| 2017/0361941 A1 | 12/2017 | Darias |
| 2018/0031698 A1* | 2/2018 | Wang .................. G01S 13/87 |
| 2018/0047294 A1* | 2/2018 | Esposito ............. G08G 5/0091 |
| 2018/0067480 A1 | 3/2018 | Ellis |
| 2018/0074189 A1* | 3/2018 | Khatwa .............. G01C 21/3691 |

\* cited by examiner

FLIGHT MANAGEMENT SYSTEM AND METHOD OF UPDATING

BACKGROUND

In contemporary aircraft, numerous data may be considered for determining desired altitudes, determining suitable waypoints, estimating time of arrival, etc. This data is often provided to the flight management system (FMS) before the aircraft takes off and may become stale during flight. Such contemporary aircraft may also rely on information gathered by their own sensing equipment.

It can be beneficial to transmit information relating to weather or environmental conditions to an aircraft in flight, such that a current or future flight path can be updated by a pilot or in an electronic component within the aircraft.

BRIEF DESCRIPTION

In one aspect, the disclosure relates to a method of updating flight calculations. The method includes flying an aircraft along a current flight path, automatically collecting real-time weather data from a network of aircraft operating in a nearby region, predicting a trajectory for completion of the flight based on at least performance data for the aircraft and the real-time weather data, and displaying at least one of an updated weather display, the predicted trajectory, an advisory alert, a change to a flight time display, or a change to a fuel consumption display based on the predicting the trajectory.

In another aspect, the disclosure relates to a flight management system. The flight management system includes a receiving module configured to receive real-time weather data from a network of aircraft operating in a nearby region, a trajectory module for predicting a trajectory for completion of the flight based on at least performance data for the aircraft and the real-time weather data from the network of aircraft, and an advisory module configured to provide a display output based on the predicted trajectory including at least one of an updated weather display, the predicted trajectory, an advisory alert, a change to a flight time display, or a change to a fuel consumption display.

DETAILED DESCRIPTION

The described embodiments of the present disclosure are directed to a weather tracking system. For purposes of illustration, the present disclosure will be described in the context of a flight management system in an aircraft environment. It will be understood, however, that the disclosure is not so limited and may have general applicability in non-aircraft applications, such as other mobile applications.

As used herein, "a set" can include any number of the respectively described elements, including only one element. All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order, and relative sizes reflected in the drawings attached hereto can vary.

Figure 1:
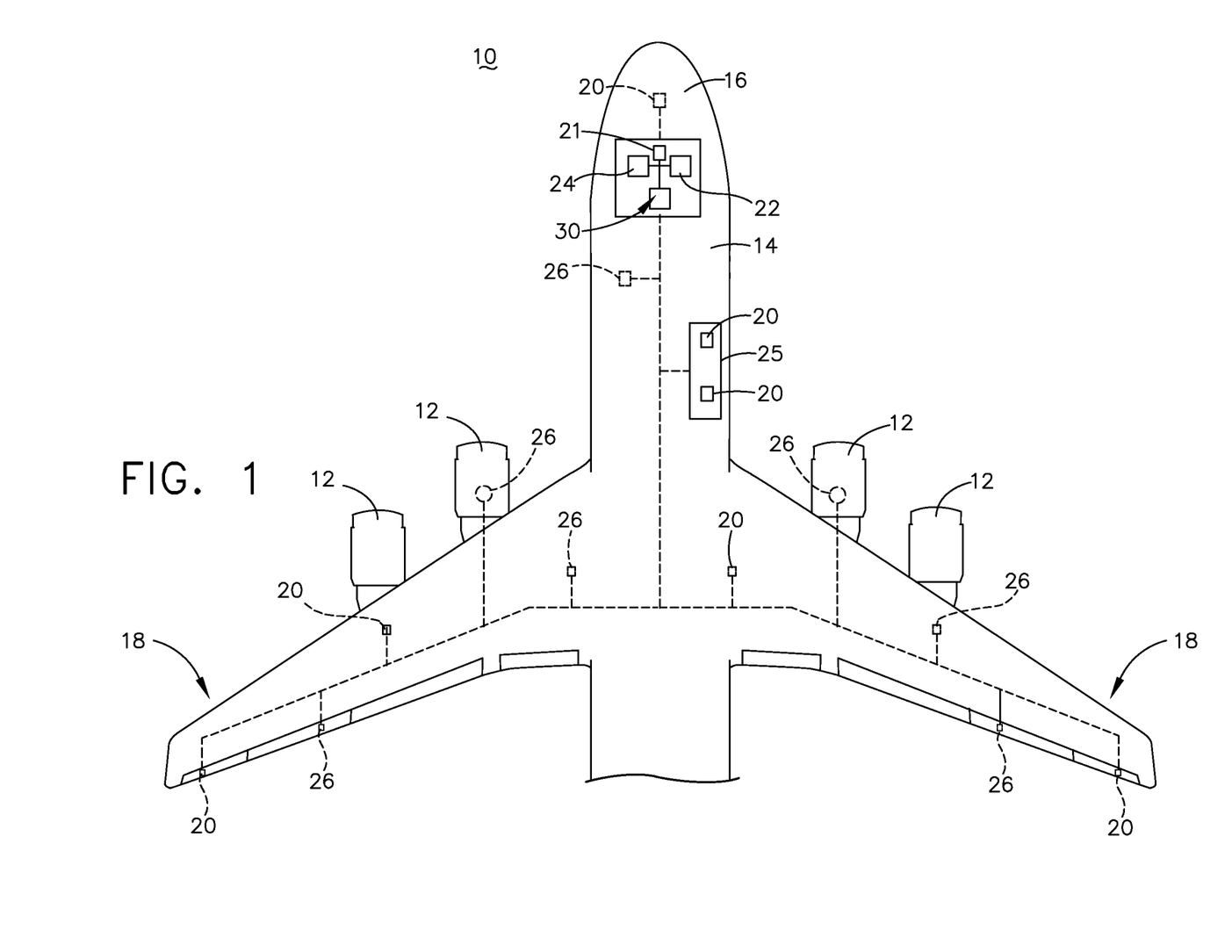
FIG. 1 is a top-down schematic view of a portion of an aircraft according to various aspects described herein.

FIG. 1 depicts an aircraft 10 that can include one or more propulsion engines 12 coupled to a fuselage 14, a cockpit 16 positioned in the fuselage 14, and wing assemblies 18 extending outward from the fuselage 14. A plurality of aircraft systems 20 that enable proper operation of the aircraft 10 can be included as well as a flight control computer 22, and a communication system having a wireless communication link 24. While a commercial aircraft has been illustrated, it is contemplated that embodiments of the disclosure can be used in any type of aircraft including, but not limited to, fixed-wing, rotating-wing, or personal aircraft.

The plurality of aircraft systems 20 can reside within the cockpit 16, within the electronics and equipment bay 25, or in other locations throughout the aircraft 10 including that they can be associated with the engines 12. Such aircraft systems 20 can include but are not limited to: an electrical system, an oxygen system, hydraulics and/or pneumatics system, a fuel system, a propulsion system, navigation systems, flight controls, audio/video systems, an Integrated Vehicle Health Management (IVHM) system, Onboard Maintenance System (OMS), Central Maintenance Computer (CMC), and systems associated with the mechanical structure of the aircraft 10. A variety of aircraft systems 20 have been illustrated for exemplary purposes and it will be understood that they are only a few of the systems that can be included in the aircraft 10.

The cockpit 16 can include at least one display 21 configured to display a variety of parameters including flight time, fuel consumption, weather conditions, pilot advisories, or current heading. The display 21 can include an electronic screen, and can also be configured to receive user input via a touchscreen, keyboard, buttons, dials, or other input devices.

The flight control computer 22, which can include a flight management computer, can among other things, automate the tasks of piloting and tracking the flight plan of the aircraft 10. The flight control computer 22 can include or be associated with any suitable number of individual microprocessors, power supplies, storage devices, interface cards, auto flight systems, flight management computers, and other standard components. The flight control computer 22 can include or cooperate with any number of software programs (e.g., flight management programs) or instructions designed to carry out the various methods, process tasks, calculations, and control/display functions necessary for operation of the aircraft 10. The flight control computer 22 is illustrated as being in communication with the plurality of aircraft systems 20, the wireless communication link 24, and the display 21. It is contemplated that the flight control computer 22 can aid in operating the aircraft systems 20 and can send and receive information from the aircraft systems 20.

The wireless communication link 24 can be communicably coupled to the flight control computer 22 or other processors of the aircraft to transfer flight data off the aircraft 10. Such a wireless communication link 24 can be any variety of communication mechanism capable of wirelessly linking with other systems and devices and can include, but is not limited to, packet radio, satellite uplink, Wireless Fidelity (Wi-Fi), WiMax, Bluetooth, ZigBee, 3G wireless signal, Code Division Multiple Access (CDMA) wireless signal, Global System for Mobile communication (GSM), 4G wireless signal, Long Term Evolution (LTE) signal, Ethernet, or any combinations thereof. It will also be understood that the particular type or mode of wireless communication is not critical to this disclosure, and later-developed wireless networks are certainly contemplated as within the scope of this disclosure. Further, the wireless communication link 24 can be communicably coupled with the flight control computer 22 through a wired link without changing the scope of this disclosure. Although only one wireless communication link 24 has been illustrated, it is contemplated that the aircraft 10 can have multiple wireless communication links communicably coupled with the flight control computer or other onboard computing device receiving flight information. Such multiple wireless communication links can provide the aircraft 10 with the ability to transfer flight data off the aircraft 10 in a variety of ways such as by satellite, GSM, and Wi-Fi.

Further, one or more sensors 26 can be provided on or within the aircraft to obtain real-time flight data. Such sensors 26 can be operably coupled to the flight control computer 22 or another controller onboard the aircraft 10 to provide the aircraft 10 within such real-time flight data. It is also contemplated that such sensors 26 can be operably coupled with the wireless communication link 24 to allow the information obtained by the sensors 26 to be relayed off the aircraft 10, such as to a second aircraft 62, without the flight control computer 22.

The one or more sensors 26 can be capable of sensing and providing both environmental and aircraft data. For example, the one or more sensors 26 can be capable of sensing, among other environmental data, weather data including temperature, pressure, real winds aloft, relative humidity, icing, and turbulence data. The sensors 26 can also be capable of integrating such information with coordinates where the data was obtained as well as a time stamp of when such information was obtained. Further, the one or more sensors 26 can be capable of sensing, among other aircraft data, data from all substantial aircraft systems including the braking hydraulics, speeds and performance parameters including deceleration data, acceleration data, landing performance data, take-off performance data, derated thrust data, runway condition parameters, aircraft weight and/or class, attitude, altitude, latitude, longitude, fuel quantity, or outside temperature. Alternatively, such aircraft data can be obtained from the aircraft systems 20 and relayed off the aircraft 10.

During operation, the flight control computer 22 can receive information from the aircraft systems 20 and/or the one or more sensors 26. For example, the flight control computer 22 can run a program for transmitting or receiving the real-time flight data. For example, the flight control computer 22 can receive data, such as real-time flight data, from one of the plurality of aircraft systems 20 or sensors 26 on the aircraft 10. In another example, the flight data computer 22 can receive data from another aircraft. The program can include a computer program product that can include machine-readable media for carrying or having machine-executable instructions or data structures stored thereon. Such machine-readable media can be any available media, which can be accessed by a general purpose or special purpose computer or other machine with a processor. Embodiments of the disclosure will be described in the general context of a method that can be implemented in one embodiment by a program product including machine-executable instructions such as program code, for example, in the form of program modules. Generally, program modules include routines, programs, objects, components, data structures, algorithms, etc. that have the technical effect of performing particular tasks or implement particular abstract data types. Machine-executable instructions, associated data structures, and program modules represent examples of program code for executing the method disclosed herein. Machine-executable instructions can include, for example, instructions and data, which cause a general purpose computer, special purpose computer, or special purpose processing machine to perform a certain function or group of functions.

The aircraft 10 can further include a flight management system or module in the form of a weather and turbulence tracking system 30 (also referred to herein as a "tracking system" 30) in communication with the flight control computer 22. It will be understood that the tracking system 30 can be hard wired to the flight control computer 22 or may communicate in any suitable manner with the flight control computer 22 including via wireless communication.

Figure 2:
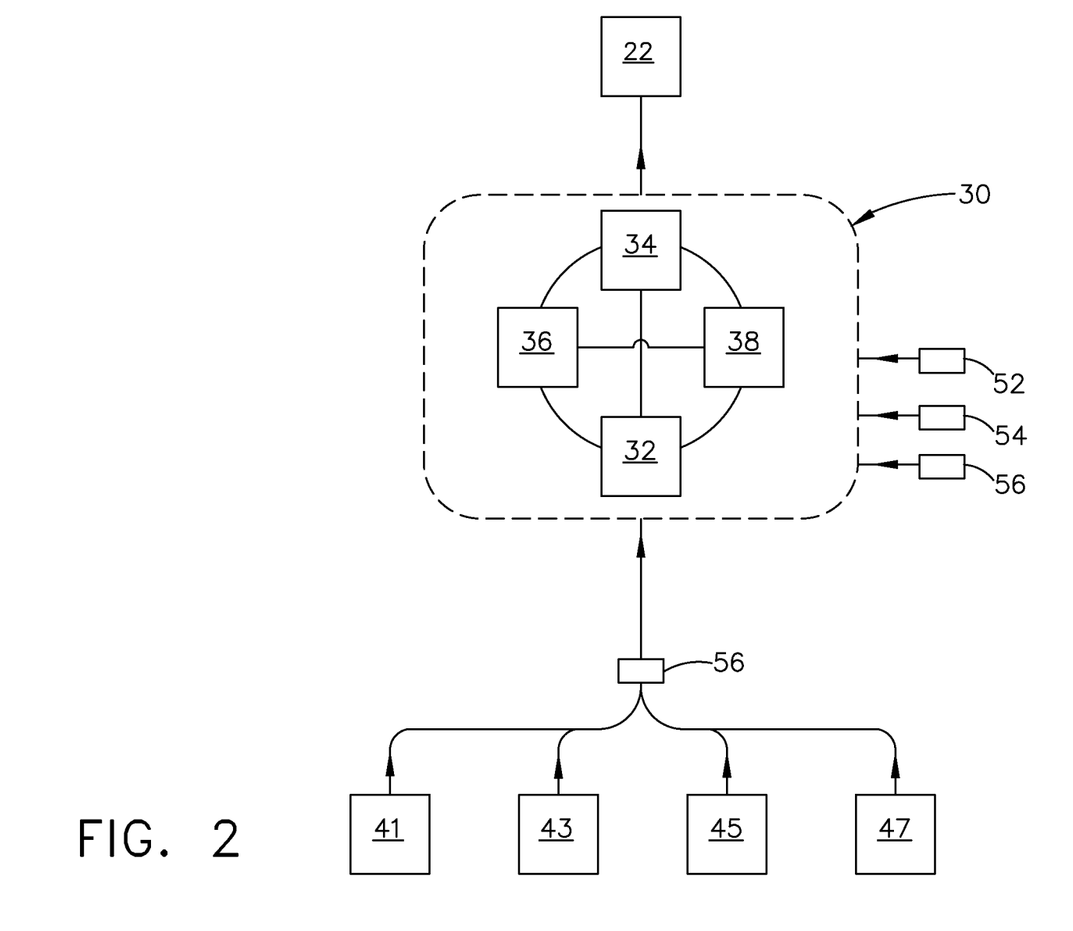
FIG. 2 is a schematic illustration of a weather tracking system in the aircraft of FIG. 1.

Referring now to FIG. 2, the tracking system 30 can include three main components: a receiving module 32, a trajectory module 34, and an advisory module 36. Optionally, the tracking system 30 can further include a cost module 38.

The receiving module 32 can be configured to receive real-time weather data 52. The weather data 52 can be received from sensors 26 on the aircraft 10, or directly from a network of aircraft 60 (FIG. 3) operating in a nearby region or indirectly from a ground system. As used herein, "nearby region" will refer to a specific spatial region related to the flight of the aircraft 10. For example, the specific spatial region can be within 100 nautical miles of a current flight path or a current flight plan of the aircraft 10. It will be understood that "nearby" can be modified from the 100 nautical miles and can be changed depending on aircraft size, geographic region, quickly-changing weather conditions, or the like. In a non-limiting example where a wide-reaching storm system is present, "nearby region" can be adjusted to within 200 nautical miles of a current flight path or a current flight plan of the aircraft 10. In another non-limiting example, "nearby region" can be within 50 nautical miles for an aircraft near a mountainous region, and within 500 nautical miles for an aircraft when flying over an ocean. In still another example, the size of the "nearby region" can be adjusted for an aircraft during flight, such as when flying through quickly-changing weather conditions.

Figure 3:
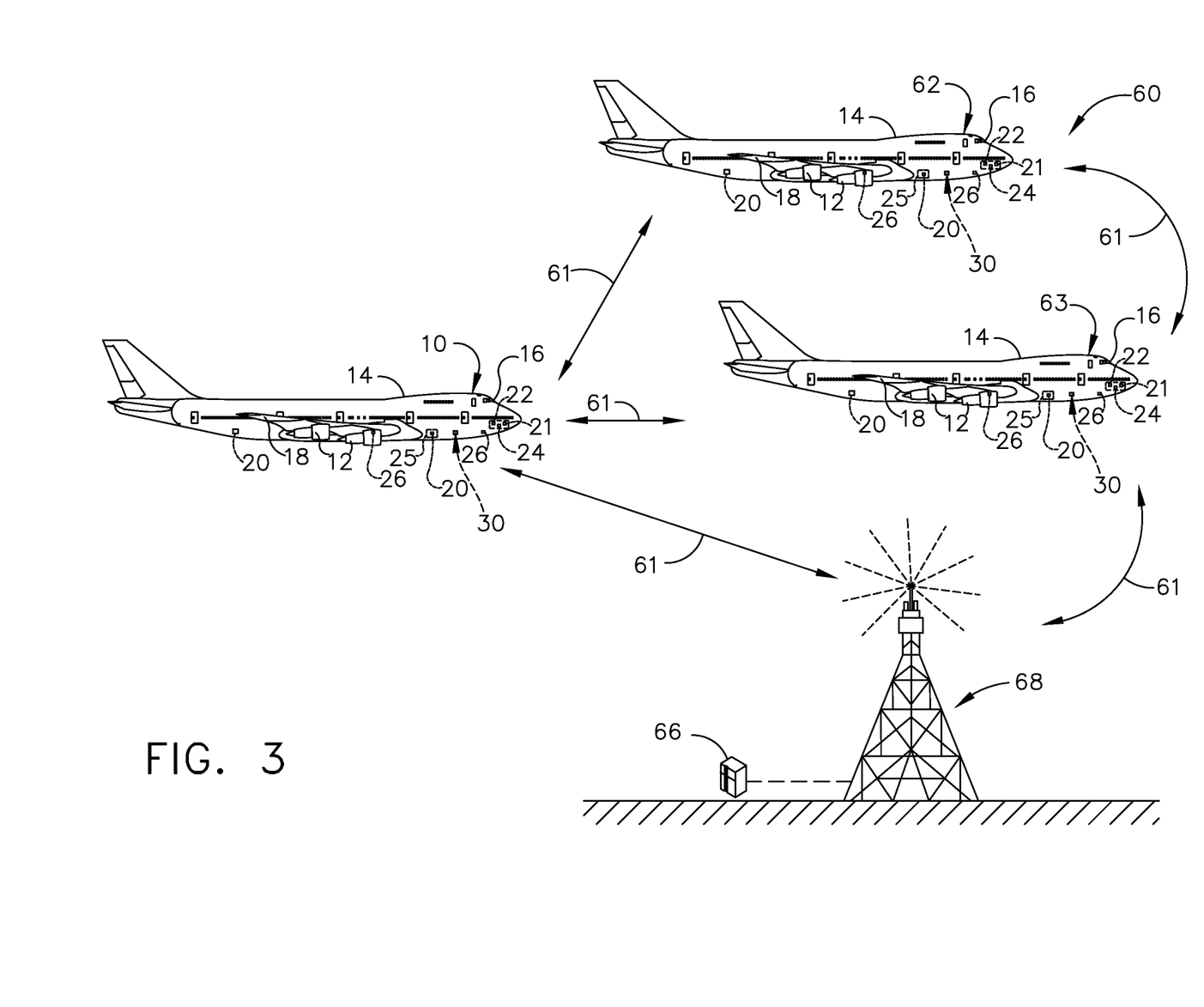
FIG. 3 is a schematic illustration of the aircraft of FIG. 1 transmitting and receiving information from a ground system and additional aircraft according to various aspects described herein.

The real-time weather data 52 can include temperature, wind conditions, a presence or severity of turbulence, precipitation, storms, or icing conditions, in non-limiting examples. The real-time weather data 52 can also include an associated position (e.g. latitude, longitude, altitude, and time) for each weather type or condition detected by the network of aircraft 60 (FIG. 3). It is further contemplated that the real-time weather data 52 can be automatically or manually collected, or collected at regular or irregular intervals as desired, for receipt by the receiving module 32. As used herein, "collected" will refer to a process of querying a source for desired data and receiving such data from that source.

The receiving module 32 can also receive sensor data such as real-time flight data 54 from one of the plurality of aircraft systems 20 or at least one sensor 26 (FIG. 1) on the aircraft 10. The flight data 54 can be sensed, including automatically sensed, during at least one phase of the flight path as the aircraft 10 is flying. Further, the receiving module 32 can be configured to automatically query for the real-time flight data 54. For example, the receiving module 32 can receive real-time flight data 54 from components within the aircraft 10 external to the tracking system 30, including by way of the sensors 26.

By way of non-limiting example, the tracking system 30 can interface with other exemplary components within the aircraft 10, illustrated as an Inertial Reference System (IRS) 41, an Air Data Computer (ADC) 43, a route planning module 45, and a Global Positioning System (GPS) module 47. The receiving module 32 can receive acceleration or heading data from the IRS 41, or temperature, pressure, true airspeed, or relative humidity data from the ADC 43, or projected waypoints from the route planning module 45, or position data from the GPS module 47, in non-limiting examples.

The trajectory module 34 of the tracking system 30 can be configured to predict a trajectory for completion of the flight based on at least performance data 56 for the aircraft 10 and real-time weather data 52 from a network of aircraft 60 (FIG. 3). More specifically, the trajectory module 34 can query the receiving module 32 or a database (e.g. a database on the aircraft 10 or on an external server, not shown) for the requested data. Upon a successful query, the trajectory module 34 can receive the requested data from the queried source, e.g. the receiving module 32 or database.

As used herein, "performance data" will refer to any data relating to the aircraft 10, or subsystems thereof, that can be utilized for predicting or analyzing a trajectory. Non-limiting examples of performance data 56 include at least one of current air speed, past air speeds, altitude, throttle setting, cruise speed, cost index, gross weight, zero fuel weight, fuel on board weight, fuel consumption rate, drag, operating envelope, or fuel/air mixture ratios. It is contemplated that the performance data 56 can be sensed by at least one of the sensors 26. The performance data 56 can also be generated by another module external to the tracking system 30.

The trajectory module 34 can predict a trajectory of the aircraft 10 based on sensor data. In one example, the trajectory module 34 can include a predictive algorithm that receives as inputs the performance data 56 and real-time weather data 52 and assigns an appropriate weight to each factor. A non-limiting example of weighting includes a reduced weight for past air speeds older than a predetermined amount, e.g. older than six hours.

The advisory module 36 of the tracking system 30 can be configured to provide a display output based on a predicted trajectory of the trajectory module 34. The display output from the advisory module 36 can include at least one of an updated weather display signal (based at least in part on the real-time weather data 52 from the receiving module 32), the predicted trajectory as determined by the trajectory module 34, an advisory alert (e.g. a recommended flight plan, a severe weather alert, or a turbulence event), or a change to a flight time display e.g. a reduced flight time due to the presence of tail winds, in non-limiting examples. For example, it is contemplated that the display output can be provided to the display 21 within the cockpit 16 (FIG. 1), including via the flight control computer 22, such as for pilot review or approval.

It is contemplated that the tracking system 30 can further include a cost module 38. The cost module 38 can be configured to calculate a cost of completing a flight plan along the predicted trajectory as determined by the trajectory module 34. The cost module 38 can also be configured to provide a display, such as an output to the display 21, related to a cost index of the predicted trajectory. In a non-limiting example, the trajectory module 34 may generate multiple predicted trajectories to avoid a weather pattern, and the cost module 38 can calculate an associated cost (e.g. structural fatigue, fuel costs, or time costs) for each predicted trajectory and the advisory module 36 can provide outputs, including on the display 21, relating to the various options allowing a pilot or other personnel to make an informed decision. It is further contemplated that the cost module 38 can output a value to the advisory module 36 to provide a display output, such as to the display 21. In one example, the advisory module 36 can receive input from the cost module 38 related to fuel consumption or costs, and the display output from the advisory module 36 can include a change to a fuel consumption display.

While the tracking system 30 is illustrated with discrete modules, it is further contemplated that any or all of the modules, including the receiving module 32, trajectory module 34, advisory module 36, and cost module 38 can be combined into a single module. For example, a single module can be configured to receive data and predict a trajectory for the aircraft. In such a case, the above-described functions of the receiving module 32 and trajectory module 34 can be combined into a single module. In still another example, all modules as described herein can be combined into a single module within an external weather server. The weather server can blend all aircraft data in real time and continually responds to data requests with the most up to date information or through an airborne system that ingests data from all surrounding aircraft and transmits to all aircraft within range of the weather server. Other examples in the spirit of the present disclosure are contemplated for use.

FIG. 3 illustrates an exemplary network of aircraft 60 that the flight control computer 22 of the aircraft 10 can also communicate with via the wireless communication link 24. The network of aircraft 60 is illustrated as including a second aircraft 62 and a third aircraft 63, either or both of which can be similarly equipped with a wireless communication link 24 and other components of the aircraft 10 as described in FIG. 1. Transmission to, from, or within the network of aircraft 60 is illustrated with arrows 61, and it should be understood the transmission can include real-time weather data 52, real-time flight data 54, real-time performance data 56, or any other suitable data. Transmission between two aircraft can occur as long as the two aircraft are within the range of the wireless communication link 24. It is further contemplated that an aircraft not within range of the wireless communication link 24 can be not queried for data. In an example where an aircraft is near the edge of wireless communication range, data received from such an aircraft can be examined for data integrity (e.g. by the receiving module 32) and discarded if data errors are detected.

In addition, each aircraft 10, 62, 63 is illustrated with two exemplary aircraft systems 20 and two exemplary sensors 26 for clarity. It will be understood that any number of aircraft system and sensors can be utilized, and further, that they can each be in communication on a given aircraft as described in FIG. 1.

Further still, the network of aircraft 60 can communicate indirectly with the aircraft 10 via a computer or destination server 66, which can be located at and include a designated ground system 68. The ground system 68 can be any type of communicating ground system 68 such as an airline operations center. Additionally, the transmission between two aircraft can be relayed through another communication link which may or may not be wireless, such as the ground system 68.

During operation, the weather and turbulence tracking system 30 can receive information from the network of aircraft 60, the flight control computer 22, the one or more sensors 26, the IRS 41, the ADC 43, the route planning module 45, or the GPS module 47 as described in FIG. 2. In one non-limiting example, the flight control computer 22 of the second aircraft 62 can execute a program for transmitting real-time weather data 52 from the second aircraft 62 to the aircraft 10 and the ground system 68. Alternatively, a separate module or computer can execute a program for transmitting the real-time weather data 52 in its raw form or transmit a derived set of information. The process can be implemented automatically by the flight control computer 22 when the aircraft 10 is in flight.

It is contemplated that after the real-time weather data 52 is relayed it can be processed either by the aircraft 10 or by the ground system 68. Processing the real-time weather data 52 can include aggregating the real-time flight data with other obtained real-time weather data 52, real-time flight data 54, or other data not obtained during flight. It should be understood that processing the real-time weather data 52 can also include extrapolation or interpolation based on the aggregated data; the real-time weather data 52 can also be processed before or after sensing the real-time flight data 54 as described in FIG. 2. Furthermore, it is contemplated that real-time weather data 52 can be sensed by the sensors 26 on the aircraft 10 and processed on the aircraft 10. The real-time weather data 52 can also be collected (e.g. queried and received) from at least one other aircraft or the ground system 68. Such data can be aggregated with data sensed on the aircraft 10 for processing, or processed separately, in non-limiting examples.

The processing can further include weighting a suitability of the real-time weather data 52 based on at least one of time, distance, or regional effect. For example, the suitability can increase, thereby being given a greater weight during processing, for weather data collected recently (e.g. within the previous hour as compared to older weather data). In another example, the suitability can decrease, thereby being given a smaller weight during processing, for weather data collected outside of a nearby region of a current flight plan or flight path, e.g. within 100 nautical miles of a current flight plan. In still another example, the suitability can increase or decrease for weather data indicating that a weather system has a regional effect, e.g. a storm system which is only likely to affect a small geographic region such as within 400 square miles, or that which is likely to be short-lived and may dissipate by the time the aircraft reaches the affected region.

In the cockpit 16, the display 21 can be updated based on the predicted trajectory as described in FIG. 2 or based on the processed or aggregated data. In one example, the display 21 can present multiple predicted trajectories to a pilot, along with their associated costs and predicted weather conditions. The pilot can select a desired trajectory from the list, including based on an automatically-generated recommendation from the trajectory module 34, advisory module 36, or the cost module 38. Furthermore, the flying, collecting real-time weather data 52, predicting a trajectory, and displaying can be repeated for a preselected number of times or continuously for the duration of the flight as desired.

Aggregated or processed data can also be transmitted to the second aircraft 62, to another aircraft such as the illustrated third aircraft 63, or to another ground station (not shown). The third aircraft 63 can either be of a same airline as the aircraft 10 or a different airline, and the third aircraft 63 can be flying along the same flight path, or a different flight path, as the aircraft 10. It is also contemplated that real-time information can be relayed through multiple additional aircraft from either the second aircraft 62 or the ground system 68. Further, the real-time flight data can be stored in a system that is accessible by the airline operating the aircraft 10 and/or by other airlines. In this manner, the data can be aggregated across multiple aircraft to build a more accurate picture of the flight environmental conditions, thus contributing to improving flight performance. Data can also be aggregated across different airlines or carriers to build a comprehensive source of information that can then be shared.

Figure 4:
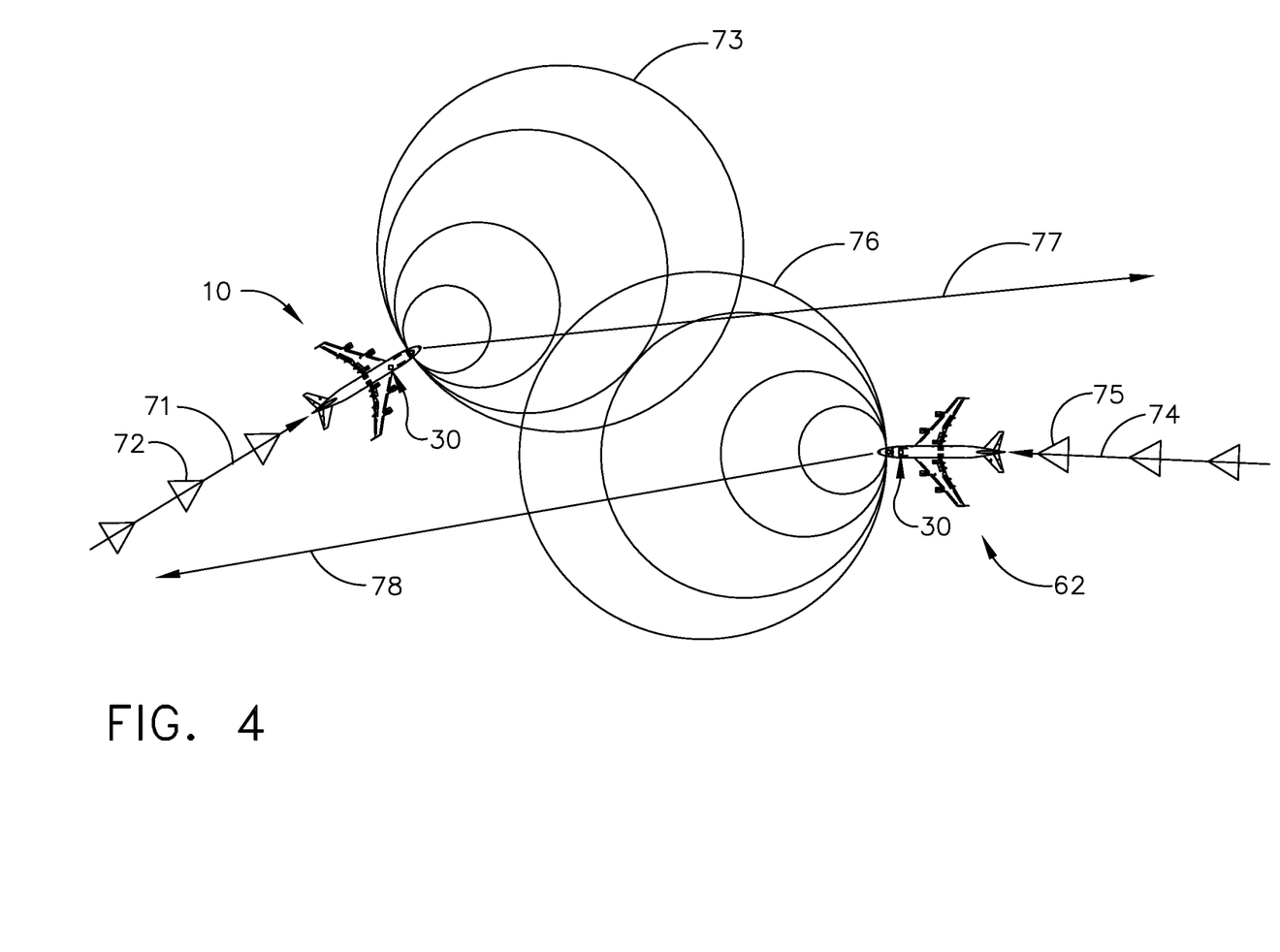
FIG. 4 is a top-down schematic view of the aircraft and an additional aircraft during operation of the weather tracking system of FIG. 2.

FIG. 4 illustrates one example of the weather and turbulence tracking system 30 in operation. The aircraft 10 is shown flying along a first current flight path 71 and collecting data at first collection locations 72, including real-time weather data 52, real-time flight data 54, or aggregated or processed data. Data transmitted by the aircraft 10 is illustrated schematically with first circles 73.

The second aircraft 62 is similarly shown flying along a second current flight path 74 and collecting data at second collection locations 75. Data transmitted by the second aircraft 62 is illustrated schematically with second circles 76. It will be understood that the first and second circles 73, 76 illustrate data transmission within specific geographical constraints, such as a maximum range of data transmission of the wireless communication link 24.

As the aircraft 10 and second aircraft 62 approach one another, they can come within a range (illustrated by the first and second circles 73, 76) such that the two aircraft can exchange real-time weather data 52 (FIG. 2), including data relating to turbulence. The aircraft 10 can receive data transmitted by the second aircraft 62 that can be aggregated or processed as described above. The trajectory module 34 (FIG. 2) of the tracking system 30 in the aircraft 10 can generate a first predicted trajectory 77, including based on at least performance data 56 (FIG. 2) and real-time weather data 52 (FIG. 2). It should be understood that the first predicted trajectory 77 can differ from the first current flight path 71, and can also differ from a current flight plan (not shown). For example, a pilot may decide not to implement a predicted trajectory from the tracking system 30 in place of a currently-implemented flight plan.

As depicted above, as the aircraft approach each other they become within range to exchange weather and turbulence data in real time. Each aircraft can use its data combined with exchanged data to extrapolate/interpolate new weather data along its projected route. In a non-limiting example, a Kalman filter can be used to blend and estimate the error associated with the incoming samples to produce new weather data that can be used in predicting new trajectories. In another example, a turbulence event within the weather data can be determined automatically by the tracking system 30, such as by repeatedly sampling the inertial reference system's accelerator outputs at a high frequency. In still another example, the tracking system 30 can be utilized to only receive data from aircraft that are flying the same leg in the same direction as the current aircraft.

The first predicted trajectory 77 can be predicted to avoid turbulent weather conditions as observed by the second aircraft 62, such as by including a smoother air passage compared to the first current flight path 71. It is contemplated that a "smoother" air passage (e.g. of the first predicted trajectory 77) can contain fewer turbulence events, lesser severity of turbulence, or smaller wind shear as compared with another air passage (e.g. the first current flight path 71).

The second aircraft 62 can also receive data transmitted by the aircraft 10. The trajectory module 34 of the second aircraft 62 can generate a second predicted trajectory 78 based on the received data (e.g. real-time weather data 52, real-time flight data 54, or real-time performance data 56). While each of the first and second predicted trajectories 77, 78 are shown as differing from the respective first and second current flight paths 71, 74, this need not be the case. More specifically, the second predicted trajectory 78 can overlie the second current flight path 74 in an example where the second current flight path 74 is calculated to be the optimal flight path due to weather, turbulence, or cost considerations. Furthermore, in another non-limiting example the first predicted trajectory 77 can differ from the second current flight path 74 of the second aircraft 62, e.g. if weather data received from the second aircraft 62 indicates turbulence events along its recently completed flight path.

It can be appreciated that the tracking system solves problems of stale or incomplete weather data for enhanced predictions in a flight management system by periodically sending and receiving weather data in an opportunistic fashion. The tracking system can sample the current aircraft sensors as well as other aircraft sensors via the receipt of airborne messages, or "pings," sent out by other aircraft in proximity that are running the same system. Thus the tracking system effectively forms an ad-hoc network of airborne weather stations. The information sent and received include weather data and the associated 4D position (latitude, longitude, altitude, and time). This information can be cross-referenced with local sensor data and the current route or flight plan to make more accurate estimations of weather based on current data gathered from other aircraft that have data that is proximal to an upstream waypoint in the current route.

Figure 5:
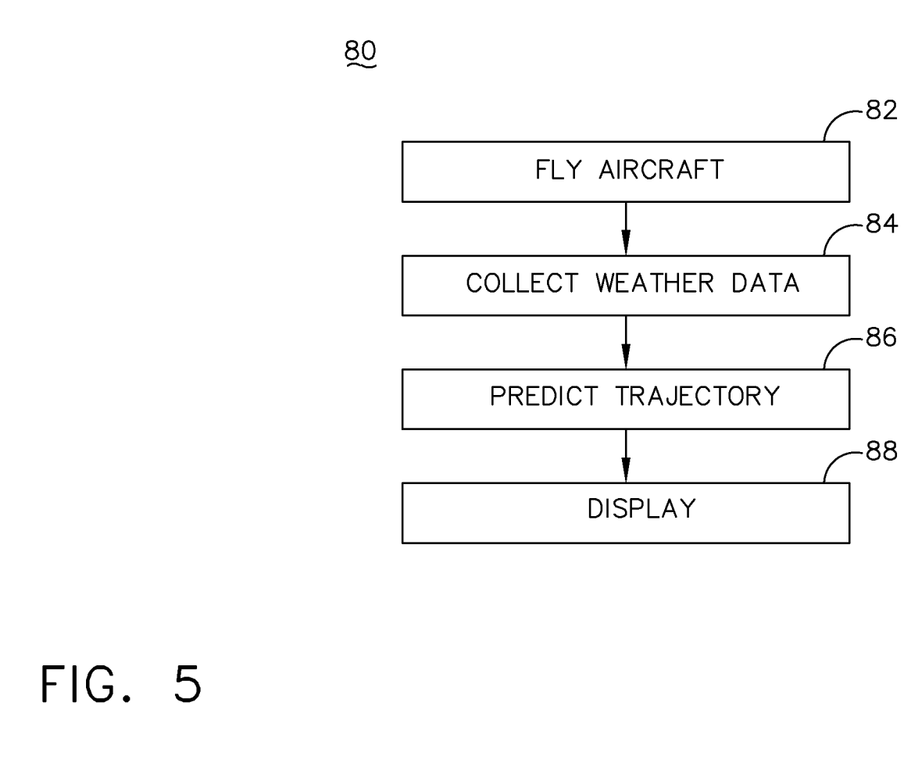
FIG. 5 is a flowchart illustrating a method of updating calculations in the weather tracking system of FIG. 2.

FIG. 5 illustrates a method 80 of updating flight calculations. The aircraft 10 can fly along a current flight path at 82, and real-time weather data 52 can be collected at 84. The collecting can be performed by the receiving module 32, such as by querying an on-board aircraft system 20 or sensor 26 for receipt of data. The collecting can also include automatically querying and receiving data from the network of aircraft 60 operating in a nearby region. The real-time weather data can further be received by the receiving module 32 of FIG. 2. Optionally, the method 80 can include automatically sensing real-time flight data 54 from at least one sensor 26. Optionally, the method 80 can further include processing the real-time weather data 52 before or after sensing the real-time flight data 54. The trajectory module 34 can predict a trajectory at 86 for completion of the flight. The trajectory can be predicted based on performance data 56 for the aircraft 10, the real-time weather data 52, real-time flight data 54, or costs calculated by the cost module 38. The method 80 further includes at 88 displaying, such as via the display 21, at least one of an updated weather display, the predicted trajectory, an advisory alert, a change to a flight time display, or a change to a fuel consumption display based on the predicting the trajectory at 86. The method 80 can optionally include repeating the flying 82, collecting 84, predicting 86, and displaying 88. Furthermore, the method 80 can optionally include a pilot accepting the predicted trajectory, and flying the aircraft 10 along the predicted trajectory.

Aspects of the present disclosure provide for a variety of benefits. Existing aircraft systems and hardware can be utilized to collect data utilized in the trajectory module, advisory module, or cost module, which can reduce operational costs while providing for improved flight planning. It can be appreciated that the improved ability to predict fuel consumption or locate alternative trajectories can yield fuel savings, e.g. by location of a tail wind or avoidance of turbulence, as well as reduce mechanical stresses on the aircraft in operation, e.g. by avoidance of inclement weather conditions. The use of real-time flight data and real-time weather data, and the appropriate weighting based on factors such as location or time, can provide for more accurate and beneficial predicted trajectories for aircraft compared to current systems with data that may be stale or inaccurate. It can be further appreciated that the improved accuracy in weather data can produce more accurate predictions of flight time and fuel expenditures, which can also allow for better performance optimization and fuel savings.

Current flight management systems in aircraft provide estimates for flight time and fuel consumption. In addition, current flight management systems attempt to optimize either flight time or fuel consumption using a cost index. The most significant factor contributing to the accuracy of the calculations are weather factors such as wind and temperatures.

As compared to current systems in use which rely on manual entries by crew, the tracking system of the present disclosure provides real-time weather and tracking data to a flight management system to aid in performance calculations and provide advisory information to the flight crew. The weather data provided allow for more accurate predictions of flight time and fuel consumption which contribute to better time management and fuel savings resulting in overall cost reduction in airline operation. The system may also use the uncertainty in weather prediction to optimize a route that gives the most likely fuel savings or most likely to meet a required time of arrival. The weather data provided may also be used to compute other aircraft engine operational parameters, such as fuel/air mixture ratios, which can enhance fuel efficiency.

Information on turbulence and severe weather is currently communicated as Pilot Reports (PIREPs) from flight crews and Significant Meteorological Information (SIGMETs) from air traffic controllers but is for general areas and not along specific trajectories. The tracking system can specifically look for these events along the currently predicted flight path.

Thus, the tracking system of the present disclosure provides for a real-time weather model that is obtained through a network of airborne assets along an aircraft's predicted trajectory to enhance its own predictions. It can be appreciated that the real-time weather and turbulence tracking system can also reduce the workload for crew both onboard and on the ground by providing a system that automates the sharing and incorporation of weather data, including turbulence avoidance, when generating predicted trajectories for the aircraft. In addition, the improved knowledge of weather events through real-time weather data and tracking can provide for increased awareness of severe weather, which increases safety during flight.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of updating flight calculations, comprising:
    automatically collecting, by a flight management system (FMS) of a first aircraft, real-time weather data directly from a second aircraft in an ad-hoc network of aircraft operating in a nearby region of a current flight path of the first aircraft when the second aircraft is flying a same leg along a same direction as the first aircraft;
    forming, in the FMS, a predicted trajectory for completion of the flight of the first aircraft based on at least performance data for the first aircraft and the real-time weather data collected from the second aircraft; and
    displaying, within the first aircraft, at least one of an updated weather display, the predicted trajectory, an advisory alert, a change to a flight time display, or a change to a fuel consumption display, wherein the displaying is based on the predicting the trajectory in the flight management system.

2. The method of claim 1, further comprising automatically sensing real-time flight data from at least one sensor located on the first aircraft when the first aircraft is flying.

3. The method of claim 2 wherein the real-time flight data is sensed during at least one phase of the current flight path.

4. The method of claim 2, further comprising processing the real- time weather data after collecting the real-time weather data.

5. The method of claim 4 wherein the processing the real-time weather data includes aggregating the real-time weather data and the real-time flight data.

6. The method of claim 1 wherein the nearby region is within 100 nautical miles of the current flight path.

7. The method of claim 1, further comprising repeating the automatically collecting real-time weather data, the forming the predicted trajectory, and the displaying.

8. The method of claim 1 wherein the performance data comprises at least one of air speed, altitude, throttle setting, cruise speed, cost index, gross weight, zero fuel weight, fuel on board weight, fuel consumption rate, drag, operating envelope, or fuel/air mixture ratios.

9. The method of claim 1, further comprising automatically determining, by the FMS, a turbulence event within the real-time weather data by sampling accelerator outputs from the ad-hoc network of aircraft corresponding to the real-time weather data, wherein the predicted trajectory is based at least on the turbulence event.

10. A flight management system (FMS) for a first aircraft, comprising:
    a receiving module of the FMS of the first aircraft, with the receiving module configured to automatically receive real-time weather data directly from a second aircraft operating in a nearby region, wherein the first aircraft and the second aircraft form an ad-hoc network when the second aircraft is flying a same leg along a same direction as the first aircraft;
    a trajectory module of the FMS of the first aircraft, with the trajectory module configured to form a predicted trajectory for completion of the flight based on at least performance data for the first aircraft and the real-time weather data received directly from the second aircraft; and
    an advisory module of the FMS of the first aircraft, with the advisory module configured to provide a display output based on the predicted trajectory including at least one of an updated weather display, the predicted trajectory, an advisory alert, a change to a flight time display, or a change to a fuel consumption display.

11. The flight management system of claim 10 wherein the nearby region is within 100 nautical miles of a current flight plan of the first aircraft.

12. The flight management system of claim 10, further comprising a cost module configured for calculating a cost of completing a flight plan along the predicted trajectory and wherein the advisory module is further configured to provide a display related to a cost index of the predicted trajectory.

13. The flight management system of claim 10 wherein the trajectory module also forms the predicted trajectory based on sensor data from sensors on the first aircraft.

14. The flight management system of claim 13 wherein the real-time weather data is weighted based on at least one of time, distance, or regional effect.

15. The flight management system of claim 10 wherein the real-time weather data is weighted based on at least one of time, distance, or regional effect.

16. The flight management system of claim 10 wherein the real-time weather data includes turbulence and the predicted trajectory includes a smoother air passage.

17. A method of updating flight calculations, comprising:
    forming an ad-hoc network of aircraft having at least a first aircraft and a second aircraft when the first aircraft and second aircraft are within a communications range of one another and when the second aircraft is flying a same leg along a same direction as the first aircraft, with the first aircraft having a first flight management system (FMS) and the second aircraft having a second FMS, wherein the first FMS is of a same type as the second FMS, and with each of the first FMS and the second FMS having a receiving module and a trajectory module;
    automatically collecting, by the receiving module of the first FMS, real-time weather data directly from the second aircraft;
    automatically collecting, by the receiving module of the second FMS, real-time weather data directly from the first aircraft;
    forming, by the trajectory module of the first FMS, a first predicted trajectory for completion of the flight of the first aircraft based on at least the real-time weather data collected from the second aircraft;

forming, by the trajectory module of the second FMS, a second predicted trajectory for completion of the flight of the second aircraft based on at least the real-time weather data collected from the first aircraft; and displaying, within at least one of the first or second aircraft, at least one of an updated weather display, the predicted first trajectory, the predicted second trajectory, an advisory alert, a change to a flight time display, or a change to a fuel consumption display;

wherein the displaying is based on at least one of the forming the first predicted trajectory or the forming the second predicted trajectory.

18. The method of claim 17, further comprising automatically determining, by the first FMS, a turbulence event within the real-time weather data received from the second aircraft by sampling accelerator outputs of the second aircraft corresponding to the real-time weather data.

19. The method of claim 17, further comprising weighting, by the first FMS, a suitability of the real-time weather data collected from the second aircraft based on at least one of time, distance, or regional effect.

20. The method of claim 19, further comprising aggregating, by the first FMS, real-time flight data from the first aircraft and the real-time weather data collected from the second aircraft.

* * * * *